United States Patent [19]
Odachi et al.

[11] Patent Number: 5,703,298
[45] Date of Patent: Dec. 30, 1997

[54] MAGNETOSTRICTIVE TORQUE SENSING DEVICE

[75] Inventors: Yasuharu Odachi; Katsufumi Tanaka, both of Kariya, Japan

[73] Assignee: Kabushiki Kaisha Toyoda Jidoshokki Seisakusho, Kariya, Japan

[21] Appl. No.: 739,464

[22] Filed: Oct. 29, 1996

[30] Foreign Application Priority Data

Nov. 27, 1995 [JP] Japan .................................. 7-307786

[51] Int. Cl.$^6$ .................................................. G02L 3/02
[52] U.S. Cl. ................................. 73/862.333; 73/862.334
[58] Field of Search ...................... 73/862.333, 862.334, 73/862.335, 862.321, DIG. 2; 324/209

[56] References Cited

U.S. PATENT DOCUMENTS

| | | | |
|---|---|---|---|
| 4,566,338 | 1/1986 | Fleming et al. | 73/DIG. 2 |
| 4,646,576 | 3/1987 | Kita | 73/862.333 |
| 4,712,432 | 12/1987 | Hochstein et al. | 73/862.334 |
| 4,765,192 | 8/1988 | Hase et al. | 73/862.36 |
| 4,891,992 | 1/1990 | Kobayashi et al. | 73/862.335 |
| 4,991,447 | 2/1991 | Yahagi et al. | 73/862.36 |
| 5,193,267 | 3/1993 | Satoh et al. | 73/862.333 X |
| 5,255,567 | 10/1993 | Miyake et al. | 73/862.333 |
| 5,307,691 | 5/1994 | Miyake et al. | 73/862.333 |
| 5,313,845 | 5/1994 | Hayashi et al. | 73/862.334 |
| 5,431,063 | 7/1995 | Yasui | 73/862.336 X |
| 5,491,369 | 2/1996 | Ishino et al. | 310/26 |
| 5,520,059 | 5/1996 | Garshelis | 73/862.335 |

FOREIGN PATENT DOCUMENTS

| | | |
|---|---|---|
| 59-77326 | 5/1984 | Japan . |
| 5045239 | 2/1993 | Japan . |
| 2232490 | 12/1990 | United Kingdom . |

*Primary Examiner*—Elizabeth L. Dougherty
*Attorney, Agent, or Firm*—Hickman Beyer & Weaver, LLP

[57] ABSTRACT

A device for detecting torque applied to a rotary shaft. The device has a sensing piece made of a magnetostrictive material and opposite ends for mounting the sensing piece on the rotary shaft. A primary coil is located around the rotary shaft for supplying magnetic flux to the sensing piece. A secondary coil is located around the rotary shaft for sending an electromotive force induced by the magnetic flux of the sensing piece. The electromotive force is measured to determine the torque applied to the shaft.

19 Claims, 3 Drawing Sheets

MAGNETOSTRICTIVE TORQUE SENSING DEVICE

BACKGROUND OF THE INVENTION

1. Field of the Invention

The present invention relates to a magnetostrictive torque sensing device, and more particularly, to a torque sensing device that detects changes in the magnetic permeability of a strained member.

2. Description of the Related Art

Typical non-contact type torque detectors that detect torque applied to a rotary shaft are proposed in Japanese Unexamined Patent Publication No. 5-118938 and Japanese Unexamined Utility Model Publication No. 4-47638. These detectors include a magnetostrictive material, which is ferromagnetic and provided on rotary shafts. Magnetic anisotropy is applied to the magnetostrictive material by forming a plurality of grooves, which are inclined with respect to the axis of the rotary shaft. An exciting coil and a detecting coil are arranged around the shaft. Application of torque on the shaft, with the exciting coil generating magnetic flux from the magnetostrictive material, strains the material and causes changes in the flux and magnetic permeability. The change in flux alters the induced electromotive force in the detecting coil. This alteration is detected by the detecting coil and used to determine the torque applied to the shaft. However, machining the grooves in the magnetostrictive material on the shaft is difficult and burdensome and thus increases costs.

A torque detector disclosed in Japanese Unexamined Patent Publication No. 59-77326 includes a magnetostrictive film, which is made of an iron based amorphous material and has a plurality of inclined slits, adhered or electroplated to the peripheral surface of a rotary shaft. An exciting coil and a detecting coil are provided on the outer periphery of the shaft. Torque is detected in a manner similar to the detectors mentioned above. However, adhesion of the film to the shaft requires the film to be accurately formed in correspondence with the peripheral surface of the shaft and is thus burdensome. Electroplating the film to the shaft requires masking to be applied to the surface of the shaft. This increases the number of manufacturing steps and increases costs.

SUMMARY OF THE INVENTION

Accordingly, it is a primary objective of the present invention to provide a torque detector that may be easily machined and thus reduces manufacturing costs.

To achieve the above objectives, a device for detecting torque applied to a rotary shaft includes at least one sensing piece, and exciting coil and a detecting coil. The rotary shaft has a longitudinal axis and at least one flat surface. The sensing piece includes a magnetostrictive material and is attached to said flat surface. The exciting coil is disposed so as to produce a magnetic flux to said sensing piece. The detecting coil is disposed so as to detect the magnitude of the magnetic flux passing through said sensing piece.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
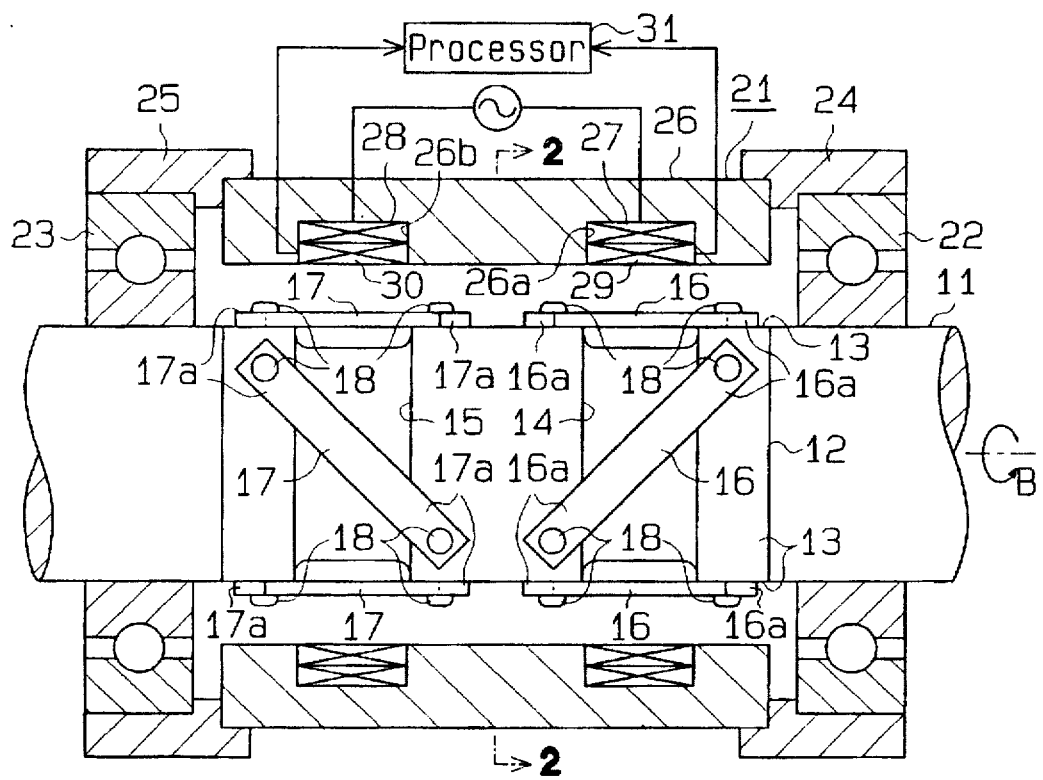
FIG. 1 is a cross-sectional view showing a torque detector according to a first embodiment of the present invention.

A torque detector according to a first embodiment of the present invention will now be described with reference to FIGS. 1 and 2. The torque detector is used in a vehicle power steering apparatus.

A steering shaft 11 includes a sensing section 12 defined at a particular location. As shown in FIG. 2, the sensing section 12 has a square cross-section, the width of which is substantially equal to the diameter of the shaft 11. The cross-section has four equal sides. The sensing section 12 thus has four flat side surfaces 13, which extend parallel to the axis of the shaft 11.

The sensing section 12 is provided with a pair of grooves 14, 15 formed in the surfaces 13 with a predetermined interval between each other. Each groove 14, 15 extends about the circumferential direction of the shaft 11. A pair of flat, elongated sensing pieces 16, 17, made of a magnetostrictive material, are attached to each surface 13.

The sensing pieces 16, 17 extend over the grooves 14, 15, respectively. That is, fastening sections 16a, 17a are defined on the ends of the pieces 16, 17, respectively. A screw 18 secures each fastening section 16a, 17a to the surfaces 13. As shown in FIG. 1, the pieces 16, 17 are arranged inclined at a predetermined angle with respect to the axis of the shaft 11 on each surface 13. Associated pieces 16, 17 are inclined in reverse directions. In this embodiment, the pieces 16 and 17 are inclined at an angle of 45 degrees and −45 degrees with respect to the axis. The middle portion of each piece 16, 17, which is separated from the bottom section of each groove 14, 15, strains easily in accordance with torque applied to the shaft 11.

The sensing pieces 16, 17 are made of a material having a magnetostrictive property, such as permalloy, iron-nickel-chromium alloy, or iron-nickel-chromium-titanium alloy, and are formed by a press. An iron-aluminum based magnetostrictive material or an amorphous magnetostrictive material may also be used for the pieces 16, 17. Alternatively, a magnetostrictive film may be provided about a core to form each of the pieces.

When stress is applied to the sensing pieces 16, 17, the magnetic property, or permeability of the pieces 16, 17, is altered. Thus, when torque is applied to the right side of the shaft 11 in the direction indicated by arrow B as shown in FIG. 1, a force acting in a compressive direction is applied to the piece 16 and thus strains it. Simultaneously, a force acting in a tensile direction is applied to the piece 17 and thus strains it. Contrarily, when torque is applied to the right side of the shaft 11 in the direction opposite to the arrow B, a tensile force is applied to the piece 16 while a compressive force is applied to the piece 17. The magnetic property, or permeability of the pieces 16, 17 is altered according to the strength of the tensile force and the compressive force. In the present invention, the stronger the tensile force is, the larger the value of the permeability becomes, and the stronger the compressive force is, the smaller the permeability becomes.

An annular stationary element 21 is provided around the sensing section 12. A pair of annular supports 24, 25 are provided at both sides of the element 21. Bearings 22, 23 are respectively located between the supports 24, 25 and the shaft 11. The bearings 22, 23 support the shaft 11 to enable the shaft 11 to rotate in both forward and reverse directions. The bearings 22, 23 and the supports 24, 25 enable the element 21 to be arranged around the shaft 11 in a stationary state.

The stationary element 21 includes an annular yoke 26, exciting coils 27, 28, which serve as primary coils, and detecting coils 29, 30, which serve as secondary coils. The yoke 26 has a substantially E-shaped cross-section as seen in FIG. 1. As shown in FIG. 2, a space is defined between the inner surface of the yoke 26 and the fastening sections 16a, 17a of the sensing pieces 16, 17.

A pair of recesses 26a, 26b are provided in the inner surface of the yoke 26. A set including the exciting coil 27 and the detecting coil 29 is arranged in the recess 26a while another set of the exciting coil 28 and detecting coil 30 is arranged in the recess 26b. Each exciting coil 27, 28 is wound about the associated detecting coil 29, 30. The set of coils 27, 29 is located around the sensing pieces 16, and the set of coils 28, 30 is located around the sensing pieces 17.

An alternating electric current having a constant amplitude and frequency is applied to the input terminal of each exciting coil 27, 28. When an alternating current is applied to the exciting coil 27, the current forms a magnetic circuit between the yoke 26, the sensing piece 16, and the yoke 26. An electromotive force is induced from the output terminal of the detecting coil 29 in accordance with the magnetic flux produced by the sensing piece 16.

When an alternating current is applied to the exciting coil 28, the current forms a magnetic circuit between the yoke 26, the sensing piece 17, and the yoke 26. Electromotive force is induced from the output terminal of the detecting coil 30 in accordance with the magnetic flux produced by the sensing piece 17.

The electromotive force induced by both detecting coils 29, 30 is proportional to the strain produced in the sensing pieces 16, 17, that is, the electromotive force is altered by the torque applied to the shaft 11.

Figure 2:
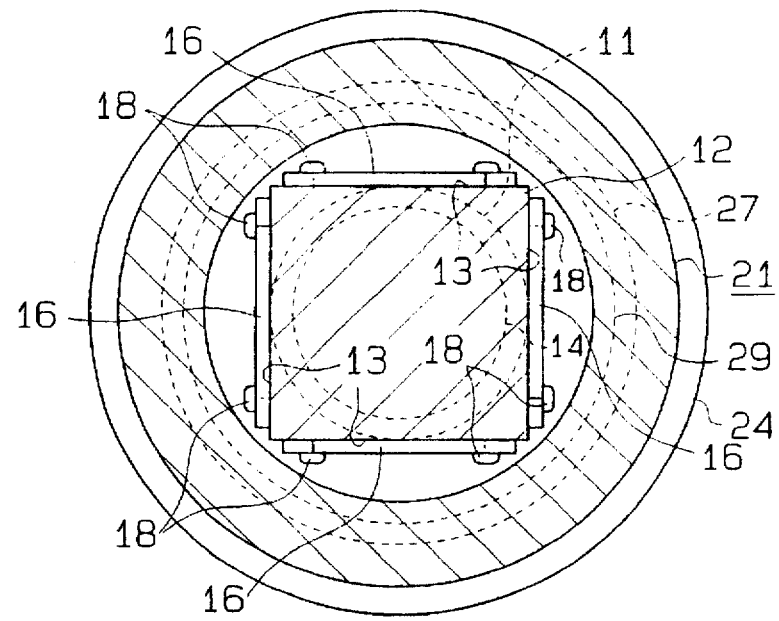
FIG. 2 is a cross-sectional view along line 2—2 of FIG. 1.

In other words, when torque is applied to the right side of the shaft 11 in the direction indicated by the arrow B shown in FIG. 1, a compressive force strains the sensing piece 16. The resulting strain is inversely proportional to the value of the torque and decreases as the torque increases. Accordingly, the value of the electromotive force induced by the detecting coil 29 is also inversely proportional to the value of the torque and decreases as the torque increases. Torque in the direction indicated by the arrow B causes tensile force to strain the sensing piece 17. The resulting strain is proportional to the value of the torque. Therefore, the value of the electromotive force induced by the detecting coil 30 is also proportional to the value of the torque and increases as the torque increases.

On the other hand, when torque is applied to the right side of the shaft 11 in the direction opposite to the arrow B, tensile force strains the sensing piece 16. The resulting strain is proportional to the value of the torque. Thus, the value of the electromotive force induced by the detecting coil 29 is also proportional to the value of the torque and increases as the torque increases. Torque in the direction opposite to the arrow B causes compressive force to strain the sensing piece 17. The resulting strain is inversely proportional to the value of the torque. Therefore, the value of the electromotive force induced by the detecting coil 30 is also inversely proportional to the value of the torque and decreases as the torque increases.

The electromotive force induced by the detecting coils 29, 30 is conveyed to a conventional processor 31 which incorporates a differential circuit and a rectifying circuit. The processor 31 calculates the value of the torque from the induced electromotive force of the coils 29, 30 by performing a subtracting process in the differential circuit and then rectifies current in the rectifying circuit. The subtracting process in the differential circuit offsets disturbance noise caused by changes in temperature and other factors and enables detection of torque with high accuracy.

The structure of this embodiment results in the following advantageous effects. Since the sensing pieces 16, 17 are flat and formed by a press, manufacturing of the pieces 16, 17 is simple and conducive to mass production. As a result, costs are reduced.

The sensing pieces 16, 17 are easily fastened to each surface 13 of the sensing section 12 by screws 18. Therefore, formation of magnetostrictive films on the surface of the shaft 11 through methods such as thermal spraying or formation of spiral grooves, either of which are necessary in the prior art, is unnecessary. This contributes to a reduction in costs. In addition, the flat surfaces 13 of the sensing section 12 simplifies the installation of the sensing pieces 16, 17. This reduces the number of assembling errors that may be made during their installation and thus reduces manufacturing costs.

The sensing pieces 16, 17 do not easily fall off since they are fastened by the screws 18. Furthermore, arrangement of the pieces 16, 17 at an angle of 45 degrees and −45 degrees with respect to the axis of the shaft 11 ensures the detection of torque applied to the shaft 11 in both forward and reverse rotating directions.

Although only one embodiment of the present invention has been described herein, it should be apparent to those skilled in the art that the present invention may be embodied in many other specific forms without departing from the spirit or scope of the invention. Particularly, it should be understood that the present invention may also be modified as described below.

(1) Instead of using the screws 18, the sensing pieces 16, 17 may be secured to the sensing section 12 through methods such as beam welding, which employs a laser, an electron beam, or the like. Methods such as spot welding, resistance welding, tungsten inert gas (TIG) welding, and metal inert gas (MIG) welding may also be used. The pieces 16, 17 may also be secured to the sensing section 12 through methods such as brazing or pressure welding.

Figure 3:
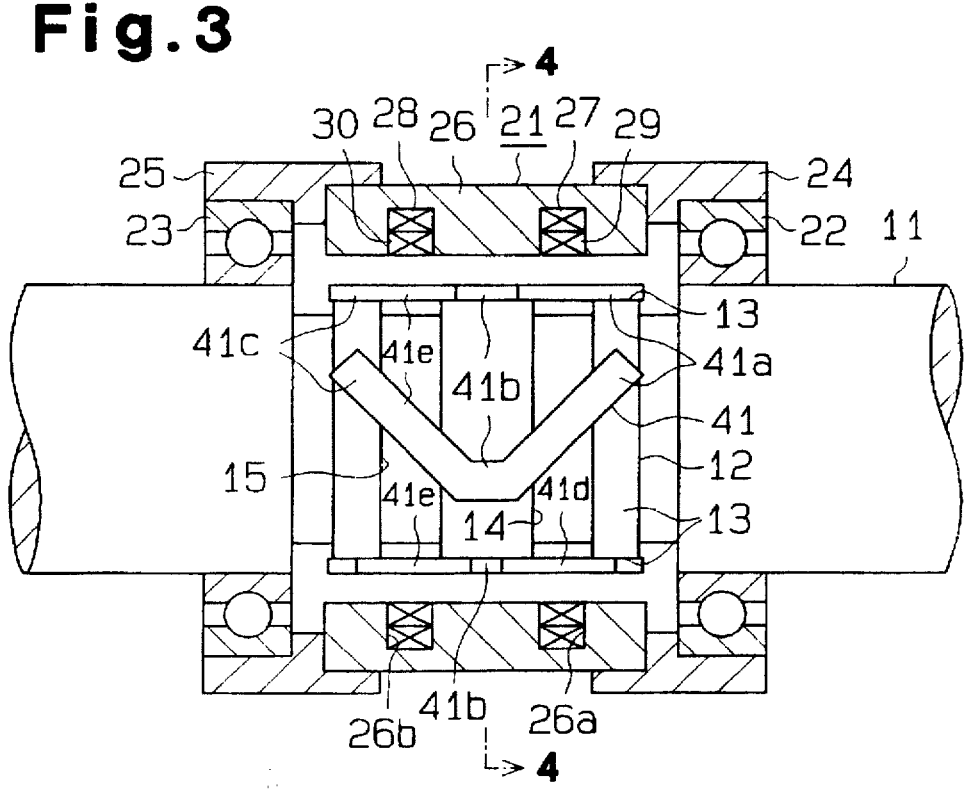
FIG. 3 is a cross-sectional view showing a torque detector according to a second embodiment of the present invention.

(2) As shown in FIG. 3, a V-shaped sensing piece 41 may be fastened to each surface 13. In this case, fastening sections 41a, 41b, and 41c are defined at the middle of the piece 41, and at the two ends. The fastening sections 41a, 41b, 41c are welded to each surface 13. In the piece 41, legs 41d, 41e are arranged along directions inclined at an angle of about 45 degrees with respect to the axis of the shaft 11 and extend in opposite directions with respect to each other. The exciting coils 27, 28 and the detecting coils 29, 30 are located in correspondence with the sections 41d, 41e. This modification will also accomplish the advantageous effects of the first embodiment. In addition, since only a single piece 41 is fastened to each surface 13, the number of assembling steps is reduced when compared to the first embodiment.

(3) The sensing pieces 16, 17 or 41 may be fastened to one, two, or three of the surfaces 13 for the detection of torque. In this case, the surface or surfaces to which the pieces 16, 17 or 41 are not fastened may be used to measure other properties of the shaft 11.

Figure 4:
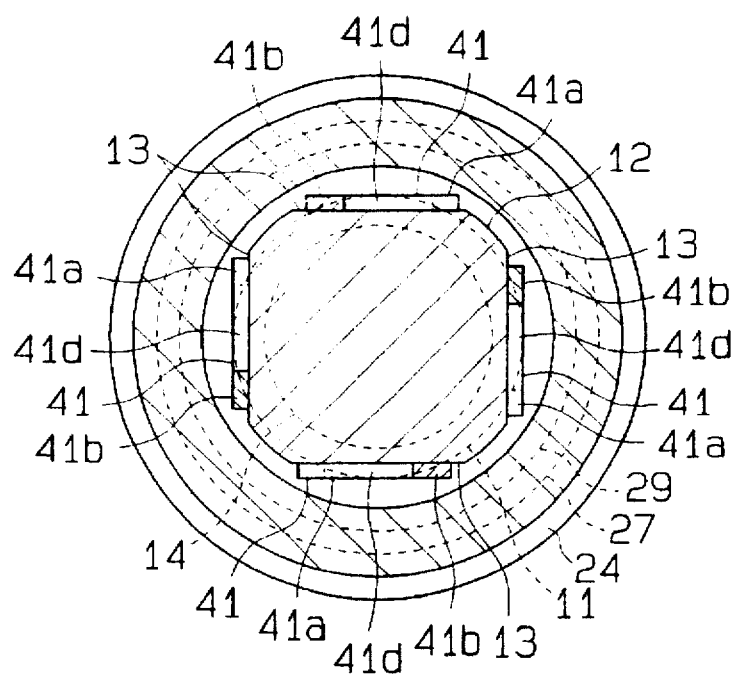
FIG. 4 is a cross-sectional view along line 4—4 of FIG. 3.

(4) The sensing section 12 in the above embodiment may have a cross-section that is polygonal, e.g., rectangular or hexagonal. If the sensing section 12 has a rectangular cross-section, the intersection of each side may be linearly or roundly cut away as shown in FIGS. 3 and 4.

Figure 5:
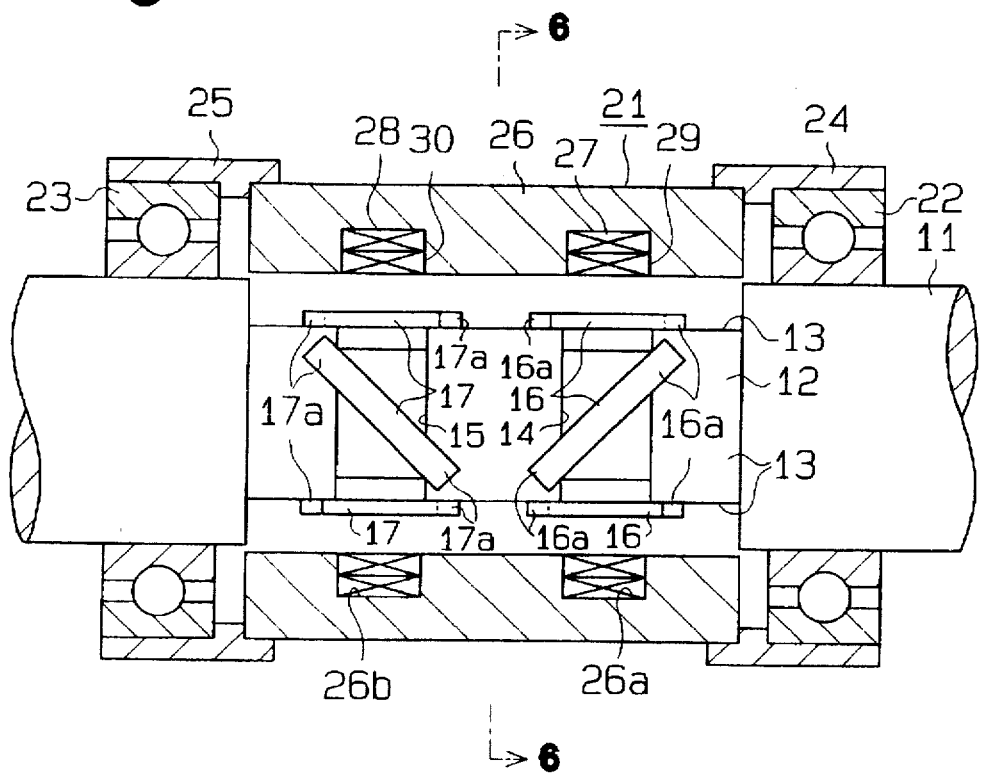
FIG. 5 is a cross-sectional view showing a torque detector according to a third embodiment of the present invention.
Figure 6:
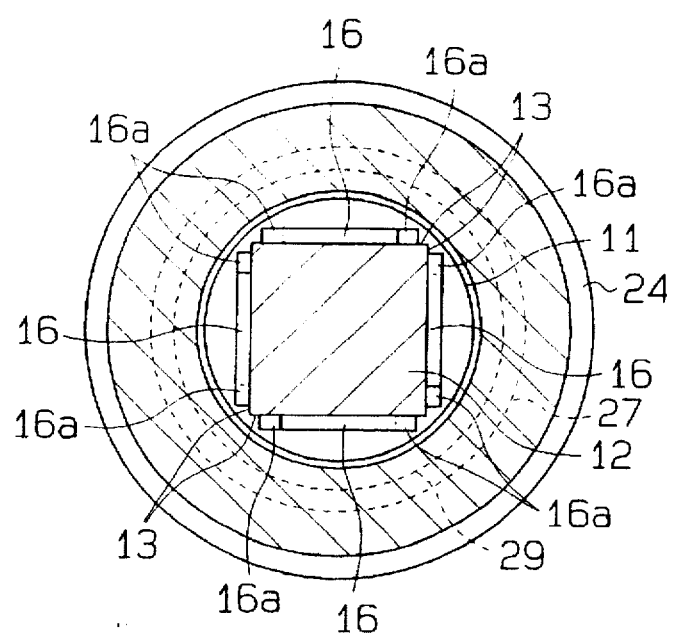
FIG. 6 is a cross-sectional view along line 6—6 of FIG. 5.

(5) As shown in FIGS. 5 and 6, the sensing section 12 may be made compact so that the section 12 and the sensing pieces 16, 17 do not protrude from the surface of the shaft 11. This prevents interference with the sensing section 12 and the sensing pieces 16, 17 when parts such as the bearings 22, 23 are mounted on the shaft 11.

(6) The sensing pieces 16, 17 and 41 may be formed curved away from the shaft 11. This will enable the grooves 14, 15 to be omitted.

(7) The exciting coils 27, 28 and the detecting coils 29, 30 may be arranged side by side rather than concentrically.

(8) The supports 24, 25 may be formed in a manner such that they form an integral cylinder. In this case, the supports 24, 25 are formed so that they separate either along a plane containing the axis of the shaft 11 or along a plane lying normal to the shaft 11 and are connected to each other when assembling the detector.

(9) The torque detector of the above embodiments may be utilized on other types of rotary shafts, such as the shaft of a torque wrench or the shaft of other various devices to detect torque.

(10) The inclined angle of the sensing pieces 16, 17 and 41 with respect to the axis of the shaft 11 may be arranged at an angle other than 45 degrees. The pieces 16, 17 and 41 may also be arranged parallel to the axis of the shaft 11. In this case, although the direction of the applied torque may not be distinguished, this structure is advantageous when used to detect torque applied constantly in a single direction since it is easily attached.

(11) In each of the above embodiments, the yoke 26 may be provided separately for each sensing piece 16, 17.

Therefore, the present examples and embodiments are to be considered as illustrative and not restrictive and the invention is not to be limited to the details given herein, but may be modified within the scope of the appended claims.

What is claimed is:

1. A device for detecting torque applied to a rotary shaft having a longitudinal axis and at least one substantially planar side surface, the device comprising:

a sensing piece including a magnetostrictive material, the sensing piece being attached to said planar side surface;

an exciting coil disposed so as to produce a magnetic flux in said sensing piece; and a detecting coil disposed so as to detect the magnitude of the magnetic flux passing through said sensing piece.

2. A device according to claim 1, wherein said sensing piece is inclined with respect to the axis of said rotary shaft and attached to said planar side surface.

3. A device according to claim 2, wherein a pair of sensing pieces, a pair of exciting coils and a pair of detecting coils are provided, the pair of sensing pieces being inclined in opposite directions with respect to each other, each sensing piece being separately fixed to the planar side surface of said rotary shaft, and wherein each sensing piece faces an associated exciting and detecting coil.

4. A device according to claim 2, wherein said rotary shaft has a plurality of planar side surfaces around the axis and wherein a plurality of sensing pieces are provided, each sensing piece being attached to an associated one of the planar side surfaces.

5. A device according to claim 2, wherein said sensing piece is formed from a pressed material selected from the group consisting of: permalloy; an iron-nickel-chromium alloy; and an iron-nickel-chromium-titanium alloy.

6. A device according to claim 2, wherein said sensing piece is fixed to the planar side surface of the rotary shaft by a screw.

7. A device according to claim 2, wherein said sensing piece is fixed to the planar surface shaft of the rotary shaft by one selected from the group consisting of: welding, soldering and brazing.

8. A device for detecting torque applied to a rotary shaft having a longitudinal axis and a flat surface the device comprising:

a sensing piece formed substantially in an integral V-shape having two sections that are inclined with respect to the axis of said rotary shaft, the sensing piece including a magnetostrictive material and being attached to said flat surface;

an exciting coil disposed so as to produce a magnetic flux in the sensing piece; and a detecting coil disposed so as to detect the magnitude of the magnetic flux passing through the sensing piece.

9. A device for detecting torque applied to a rotary shaft having a longitudinal axis and a flat surface, the device comprising;

a sensing piece that includes a magnetostrictive material, the sensing piece being attached to said flat surface wherein said sensing piece is attached to said flat surface of the rotary shaft such that a center portion of the sensing piece is not fixed to the flat surface;

an exciting coil disposed so as to produce a magnetic flux in the sensing piece; and a detecting coil disposed so as to detect the magnitude of the magnetic flux passing through the sensing piece.

10. A device according to claim 9, wherein the sensing piece is flat and the flat surface of the shaft includes a groove that is bridged by the flat sensing piece.

11. A device according to claim 9, wherein said sensing piece is made of a rigid flat plate.

12. A device for detecting torque applied to a rotary shaft comprising:

a rotary shaft having a longitudinal axis;

a sensing piece including a magnetostrictive material, the sensing piece taking the preformed rigid plate that is attached to a surface of the shaft without being further formed;

an exciting coil disposed so as to produce a magnetic flux in said sensing piece; and a detecting coil disposed so as to detect the magnitude of the magnetic flux passing through said sensing piece.

13. A device according to claim 12, wherein said sensing piece is formed from a pressed material selected from the group consisting of: permalloy; an iron-nickel-chromium alloy; and an iron-nickel-chromium-titanium alloy.

14. A device for detecting torque applied to a rotary shaft comprising:

a rotary shaft having a longitudinal axis;

a sensing piece including a magnetostrictive material, the sensing piece taking the form of a preformed rigid plate, wherein said rotary shaft includes a groove that is bridged by the sensing piece;

an exciting coil disposed so as to produce a magnetic flux in the sensing piece; and a detecting coil disposed so as to detect the magnitude of the magnetic flux passing through the sensing piece.

15. A torque transmitting shaft adapted for use with a torque sensing device, the torque transmitting shaft including:

- a sensing section having at least one substantially flat surface; and
- a sensing piece attached to the flat surface, the sensing piece being formed at least partially from a magnetostrictive material and being arranged such that a center portion of the sensing piece is not fixed to the flat surface of rotary shaft.

16. A torque transmitting shaft according to claim 15, wherein the sensing section has a substantially polygonal cross section and includes a plurality of substantially flat surfaces.

17. A torque transmitting shaft according to claim 15, wherein the sensing piece is flat and the flat surface of the shaft includes a groove that is bridged by the flat sensing piece.

18. A torque transmitting shaft according to claim 15, wherein said rotary shaft is a steering shaft for an vehicle.

19. A device for detecting torque applied to a rotary shaft comprising:

- a sensing section defined in said rotary shaft and having four flat surfaces, each of said flat surfaces having formed therein at least one groove;
- at least one sensing piece attached to said flat surface extending over said groove and inclined with respect to the axis of said rotary shaft; and
- a stationary element provided in a non-contact manner with respect to said rotary shaft, said stationary element including an exciting coil and a detecting coil that are disposed in peripheral region of said rotary shaft so as to face said sensing piece.

* * * * *